Figure 1:
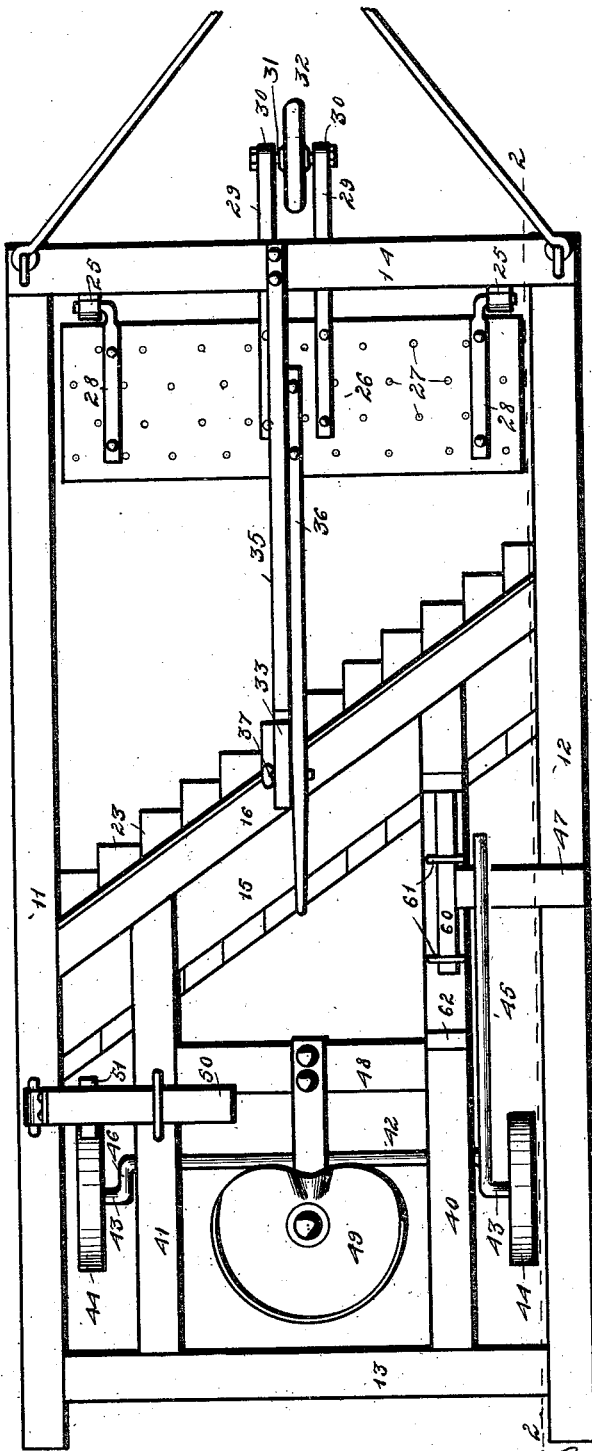

J. S. LORD.
ROAD GRADER.
APPLICATION FILED JAN. 23, 1911.

990,488.

Patented Apr. 25, 1911.
2 SHEETS—SHEET 1.

Witnesses.
W. A. Loftus
A. G. Hague

Inventor.
John S. Lord
by J. Ralph Enwig atty

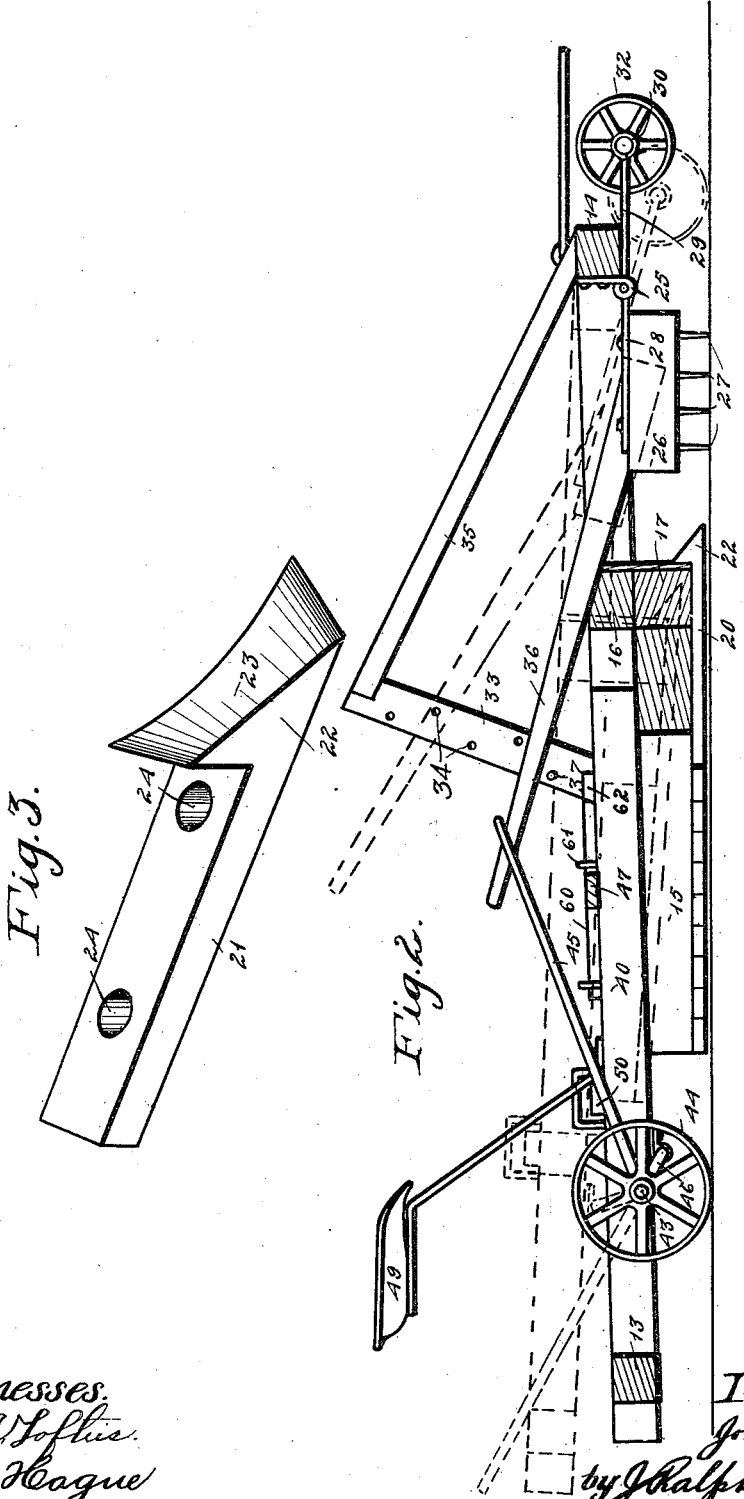

UNITED STATES PATENT OFFICE.

JOHN S. LORD, OF OGDEN, IOWA.

ROAD-GRADER.

990,488.

Specification of Letters Patent.

Patented Apr. 25, 1911.

Application filed January 23, 1911. Serial No. 604,136.

*To all whom it may concern:*

Be it known that I, JOHN S. LORD, a citizen of the United States, residing at Ogden, in the county of Boone and State of Iowa, have invented a certain new and useful Road-Grader, of which the following is a specification.

The object of my invention is to provide a grader of simple and inexpensive construction in which substantially all side draft is avoided and in which loose earth on the cutting blade may be laterally discharged from the machine.

These objects are attained by providing a cutting blade in independent sections, the cutting edge of each section being at right angles to the longitudinal axis of the grader, said sections being arranged in a series in which the first section is secured at one side of the machine near the forward end and the others are placed in adjacent succession, each being rearward in the grader from the one preceding.

A further object is to provide a grader in which the cutting blade is constructed in separate, independent sections, each of which may be easily removed and repaired, sharpened or replaced without taking the whole of the cutting blade out of the machine.

A further object is to provide in a grader a toothed plate or harrow and a front wheel pivoted to the frame of the grader with accompanying mechanism whereby the front end of the grader may be readily adjusted to rest or travel on the harrow or the wheel as the operator may desire.

A further object is to provide suitable mechanism whereby the cutting blade and frame of the grader are mounted on wheels and may be readily raised or lowered with reference to said wheels and to the surface on which the grader rests.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top, plan view of a grader embodying my invention. Fig. 2 shows a sectional view of a side elevation of same on the line 2—2 of Fig. 1, the dotted lines showing the grader with the cutting blades raised off the ground, and Fig. 3 shows a perspective view of one of the separate sections of the cutting blade.

Referring to the accompanying drawings, I have used the reference numerals 11 and 12 to indicate the longitudinal or side members and the numerals 13 and 14 the end members of a frame. The cross piece 15 extends diagonally across the machine from the member 11 to the member 12 and is secured to said members. The cross piece 16 extends diagonally across the machine from the member 11 to the member 12, being in front of, and adjacent to the cross piece 15. Beneath the member 16 and secured thereto is a cross piece 17 of approximately the same width as the piece 16 but extending to the outer edges of the members 11 and 12, to which members the said cross piece 17 is secured.

The numeral 21 indicates the rearward portion of one of the separate cutting blades, said portion being rectangular in cross section. The numeral 22 indicates the forward portion of the said cutting blade which is triangular in shape as viewed on side elevation, said forward portion being thicker on its rearward side than the said rearward portion of the cutting blade and tapering from its highest point which is on its rearward side to a sharp edge at its forward end. The bottom of the said blade is flat and the cutting edge is at right angles to its longitudinal axis. The upper surface 23 of the forward portion is substantially concave from the highest point to the cutting edge. The rear surface of said forward portion, above the rearward portion 21, is flat and beveled, being designed to fit the cross piece 17, while the cutting edge is directed forwardly therefrom. The distance therefore between one end of the sharp edge and the highest point of the blade on that side will be shorter than the distance between the other end of the sharp edge and the highest point on the other side  The line of highest elevation of the blade is horizontal. The rearward portion is constructed with openings 24 designed to receive bolts or other devices for fastening the cutting blade to the cross piece 17. The said cutting blades are bolted side by side on the lower side of the cross piece 17. Beginning with the cutting blade at the forward end of the cross piece 17 each succeeding blade is at the side of the one preceding and farther back in the machine, the cutting edge of each being at right angles to the length of the grader and the said blades, when looked at from above, form a series of right angles with each other (see Fig. 1). By this arrangement the draft of the blades in cutting or planing the surface of the road is forward, while loose earth on the forward surfaces of the cutting blade will be laterally discharged from the grader.

Extending downwardly from the end member 14 on its rearward side are bearings 25. Just back of the member 14 is a plate 26 of strong material, substantially rectangular in shape and spaced apart from the members 11, 12 and 14 and having downwardly extending teeth or pins 27 set in staggered arrangement, as shown in Fig. 1, the said plate and teeth forming a harrow. Transversely across said plate are strips 28 of strong, rigid material, preferably iron, bolted to said plate and having at their forward ends a portion bent at right angles to the main part of said strips, said ends being cylindrical in shape and rotatably mounted in the bearings 25. Near the center of said plate and at equal distances from said center are transverse strips 29, parallel to each other, bolted to said plate and extending forwardly beneath the cross piece 14 to a point in front thereof. Said strips are bent into rings at their forward ends to form bearings 30. In the bearings 30 is mounted an axle 31 on which is rotatably mounted the wheel 32, having a rounded tire.

Extending upwardly and forwardly from a point near the center of the cross piece 16 is a strong, rigid arm 33 having openings 34 designed to receive a bolt or pin. Rigidly secured to said arm 33 at its upper end and extending downwardly and forwardly therefrom to the end member 14 is an arm 35 of wood or metal rigidly secured at its lower end to said end member 14. Rigidly secured to the plate 26, near the center thereof, is an arm or lever 36 extending upwardly and rearwardly from the member 14 and being adjacent at its upper end to the arm 33. A bolt 37 is placed in one of the openings 34 beneath the lever 36 and may be changed to other of the openings 34 to hold the lever 36 in various points of its adjustment, upwardly or downwardly adjacent to the arm 33. By the adjustment of the lever 36, the front end of the grader will be caused to rest either on the wheel or on the harrow as may be desired.

The frame member 40 is spaced apart from the frame member 12 and extends longitudinally in the grader from the end member 13 to the cross piece 15 and is securely fastened to said member 13 and the cross piece 15. The frame member 41 is spaced apart from the frame member 11 and extends longitudinally in the grader from the end member 13 to the cross piece 15 and is securely fastened to said member 13 and the cross piece 15. Rotatably mounted on the lower side of said members 40 and 41, and extending across the machine is the axle 42 which, at each end, is bent to form cranks 43, the arms 46 of which extend rearwardly when the grader is in lowered position. Wheels 44 are rotatably mounted at each end of the axle 42 upon the ends of the cranks 43.

Extending upwardly and forwardly, when the grader is in lowered position from the end of one of the cranks 43 and rigidly secured thereto just inside of the wheel, is a lever 45 which, as shown in the drawings, forms an acute angle with the crank arm 46 (Fig. 2), and rests on the cross bar 47 when the grader is in said lowered position. When the lever 45 is raised, the crank arm 46 is brought forward toward vertical position and as this lever is pushed farther rearward, the crank arm 46 reaches vertical position and the axle 42 is raised, thereby raising the frame of the machine and lifting the cutting blades above the surface on which the machine rests. By pushing the lever 45 still farther rearward the lever passes the point of gravity and may be brought to lie against the crosspiece 13, and the grader will remain in raised position, as shown by the dotted lines in Fig. 2.

A bar 47 extends across the member 40 and the member 12 at right angles thereto in front of the axle 42. The bar 47 may be moved forwardly or rearwardly on the members 40 and 12 and the lever 45 thus held in various positions of its adjustment.

The numeral 60 indicates a bar secured to the bar 47 at right angles thereto over the member 40 and slidingly mounted in the staples 61.

62 indicates blocks secured to the member 40 and designed to limit the movement of the bar 60.

The bar 47 is designed to hold the lever 45 when the grader is in lowered position, and to prevent its further downward movement.

A cross piece 48 extends from the member 41 to the member 40 and is fixed to said members. The seat 49 is fixed to the cross piece 48.

Slidingly mounted over the wheel 44 on the members 41 and 11 and extending from one to the other is a bar 50 on the under side of which, over the wheel 44, is a shoe 51 designed to engage said wheel when the grader is in raised position and to serve as a brake. The said bar 50 may be removed when desired.

In the operation of my improved road grader, the cutting edges of the cutting blades 20 are at right angles to the length of the grader. When the machine is drawn forward the side pull, incident to ordinary graders of this sort, is avoided. The teeth 27 in the plate 26 serve as a drag for a road or other earth surface and also loosen the clods and earth. By raising the lever 36 the wheel 32 serves as a fulcrum and the grader is raised in front as shown by the dotted lines in Fig. 2. The lever 36 is held in any position of its adjustment by placing beneath it, in one of the openings 34, the bolt or pin 37. By means of the lever 36, the front end of the grader may be made to rest on the harrow, or on the front wheel as may be desired. When the machine is in lowered position its rear end may be raised by raising the lever 45. In this operation the end of the crank 43 serves as a rock bar and as the lever 45 is raised and pushed rearwardly the wheels 44 are forced forwardly in the machine and the axle 42 is raised on the cranks 43, thus raising the frame of the machine. The lever 45 reaches the point of gravity before it rests upon the member 13.

My improved grader has a great advantage over the graders now in use in its simplicity and cheapness of construction.

Another advantage is the direct forward draft on account of which the grader requires less power for its operation, while at the same time any loose earth on the forward surfaces of the sections of the blade is laterally discharged from the machine.

Still another advantage lies in the construction of the cutting blade in separate sections, any one of which may be readily taken from the machine and repaired, sharpened or replaced without removing any of the others. In the ordinary single blade road grader if the blade is broken the whole blade must be replaced while in my grader the blade sections can be replaced at a comparatively small expense.

By raising or lowering lever 36, as hereinbefore set forth, the forward end of the grader may be made to rest either on the harrow or on the forward wheel or partly on each.

Another advantage lies in the construction and arrangement of the rear axle and wheels and the lever 45, whereby the frame of the grader and the cutting blades are readily and easily raised in relation to the wheels and to the surfaces on which the machine rests. By raising the front end of the machine on the front wheel and lowering the rear end, the grader may be made to travel on the front wheel and the rear lower surfaces of the cutting blades, the grader thus operating as a drag for packing the earth. By proper adjustment readily made the grader may be made to travel on the harrow and the rear wheels, with the cutting edges of the blades lowered to plane the surface of the road. Where the road is rough a large part of the earth removed by the cutting blades from the higher places will fall into the lower places of the road surface. The forward surfaces of the cutting blades, and the cross members to which said blades are attached, form a continuous mold board extending diagonally across the grader, whereby any surplus earth not falling into depressions in a rough road will be laterally discharged from the grader. Side draft is avoided by the fact that the cutting edges are at right angles to the longitudinal axis of the machine. In the graders commonly used the cutting blade is dragged over the surface of the ground, scraping off a portion thereof. The draft incident to their operation on the packed surface of a road is very great. My grader does not scrape the surface of the road but planes it with a clean cut and the draft incident to the operation is much less than that incident to the use of a scraper. My grader consequently requires less power for its operation than the common road scraper.

I claim as my invention:

1. In a road grader of the class described, a cutting blade arranged diagonally in the machine and having cutting edges at right angles to the longitudinal axis of the grader and said cutting edges being constructed in a series, beginning at one side of the machine near the front, each succeeding edge being rearward in the machine from the one preceding.

2. In a grader for earth surfaces, a cutting blade, comprising independent similar sections, designed to be arranged in a series adjacent to each other, each of said sections having a flat bottom portion and having its cutting edge at right angles to its longitudinal axis, and having a flat rearward portion 21 and a forward portion 22 of greater thickness at its rear end than the rearward portion and tapering in substantially concave form from its thickest part to a sharp cutting edge at its most forward point, the rear surface of said forward portion 22, above the rearward portion 21, being beveled from one side to the other.

3. In a grader for earth surfaces, a cutting blade, comprising independent similar sections, each of which has a sharp cutting edge at right angles to the longitudinal axis of the grader, said sections being arranged in the grader in a series, wherein one section is placed near one side of the grader and the others are arranged in adjacent succession, each being rearward in the machine from the one preceding.

4. In a grader for earth surfaces, a frame, cross pieces fixed thereto diagonally across the longitudinal axis of the grader, a cutting blade comprising independent sections, each of said sections having a flat bottom portion and having its cutting edge at right angles to its longitudinal axis, said sections being arranged in a series beneath the said cross pieces and fixed thereto beginning at the forward end thereof, each section after the first being adjacent to, and rearward in the machine from the one preceding, and means for raising the cutting edge from the surface on which the grader rests.

5. In a road grader, a frame, a cutting blade secured thereto, a front wheel on which said frame is mounted, a rear axle rotatably mounted on said frame, which axle is bent at both ends to form cranks, the arms of which extend rearwardly when the machine is in lowered position, wheels rotatably mounted on said axle, a lever rigidly secured to said axle just inside the wheel and extending upwardly and forwardly in the grader when it is in lowered position, a cross bar slidingly mounted on the grader frame and designed to hold said lever in its forward position and to prevent further downward movement, and means for holding said lever in position and preventing its further downward movement when it is thrown upwardly and rearwardly past the point of gravity.

6. In a grader for earth surfaces, wheels, a frame mounted thereon, cross pieces fixed thereto diagonally across the longitudinal axis of the grader, a cutting blade comprising independent sections, each of said sections having a flat bottom portion and having its cutting edge at right angles to its longitudinal axis, said sections being arranged in a series beneath the said cross pieces and fixed thereto beginning at the forward end thereof, each section after the first being adjacent to, and rearward in the machine from the one preceding, means for raising the rearward end of said frame in relation to the rear wheels, and means for raising the forward end of said grader in relation to the front wheel.

7. In a road grader of the class described, a substantially rectangular frame mounted on a rear axle and wheels, a cutting blade therein, a harrow in the forward end of the said grader spaced apart from the frame members of the grader and pivotally secured to the front end member of said frame, strong rigid strips, extending transversely across said harrow and secured thereto, said strips extending to a point in front of the front end member of the grader frame and being pivoted thereto, and forming bearings at the forward ends of said strips, a wheel rotatably mounted in said bearings, means for causing the forward end of the grader to rest on the harrow or the wheel, as the operator may desire.

8. In a road grader of the class described a substantially rectangular frame, a harrow in the forward end of the grader spaced apart from the frame members thereof and pivotally secured to the front end member, strong rigid strips secured to said harrow and extending forwardly to a point in front of the forward frame member of the grader, and pivoted to said frame member, a wheel revolubly mounted upon said strips, at their forward ends, a lever rigidly secured to the said harrow and extending upwardly and rearwardly therefrom in the grader, means for holding said lever in any position of its upward or downward adjustment, whereby the forward end of the grader is caused to rest either on the harrow or the wheel or partially on each.

9. In a grader of the class described a frame substantially rectangular in shape, a cutting blade composed of independent similar sections leaving their cutting edges at right angles to their longitudinal axis, and surfaces extending upwardly and rearwardly from said cutting edges said sections being arranged in a series wherein one section is near the forward end of one side of the grader and the others are placed in adjacent succession, each rearward in the machine from the one preceding, the cutting edges of said sections being directed forwardly in the grader so that the draft caused by the said sections in cutting road surfaces is forwardly, while loose earth on the forward surfaces of said sections is laterally discharged from the grader, a harrow in the forward end of said grader, a supporting wheel mounted on the frame of said grader at the forward end, means for adjusting said forward end of the grader, in relation to said harrow and said wheel, whereby the front end of said grader may be made to rest on said harrow or said wheel or partially on each, as may be desired, an axle, rotatably mounted on the grader frame near the rearward end and having cranks formed at its ends, wheels revolubly mounted on said cranks, a lever rigidly secured to said axle at right angles to the length thereof and designed for turning said axle on its longitudinal axis whereby the crank arms may be varied from horizontal to vertical position and the frame and the cutting blade of the grader correspondingly lowered or raised in relation to the rear wheels and the surface on which they rest, means for holding said last mentioned lever in any position of its adjustment.

Des Moines, Iowa, Nov. 29, 1910.

JOHN S. LORD.

Witnesses:
MARY WALLACE,
M. B. PETERSON.

Copies of this patent may be obtained for five cents each, by addressing the "Commissioner of Patents, Washington, D. C."